June 5, 1956 W. F. EAGAN 2,749,500

VOLTAGE DEVIATION DETECTOR

Filed March 3, 1955

Inventor
William F. Eagan
by Howard M. Herriot
Attorney

United States Patent Office 2,749,500
Patented June 5, 1956

2,749,500

VOLTAGE DEVIATION DETECTOR

William F. Eagan, West Allis, Wis., assignor to Allis-Chalmers Manufacturing Company, Milwaukee, Wis.

Application March 3, 1955, Serial No. 491,819

9 Claims. (Cl. 322—28)

This invention relates in general to electric regulating systems and in particular to A. C. voltage deviation detectors for use in such systems.

Deviation detectors are known which utilize first and second detector elements for obtaining first and second signals and which differentially compare these signals to obtain a control signal which varies in both magnitude and direction with deviations of the regulated voltage from a predetermined value.

The detector elements, which may be either first and second reactors having dissimilar saturation characteristics or first and second resistors having dissimilar current-resistance characteristics, are connected in parallel across the regulated voltage. A first load element is connected to be traversed by the current traversing the first detector element and a second load element is connected to be traversed by the current traversing the second detector element.

A disadvantage of these prior art devices is that additional equipment is needed to provide independent or isolated circuits for each of the load elements so that each of them is affected only by its associated detector element and is unaffected by the other detector element. This has been done by either isolating the detector elements from each other or by isolating the load elements from each other. In either case, it requires extra equipment, such as an isolating transformer, extra isolating wiring, or a center tapped load element arrangement, or a combination of these.

It has been discovered that this disadvantage is overcome by providing means including a saturable transformer which not only produces the desired signals in a first and a second load element but also, without additional equipment, provides independent or isolated circuits for the load elements.

It is therefore an object of this invention to provide an effective, simple and inexpensive A. C. voltage deviation detector.

Another object of this invention is to provide an A. C. voltage deviation detector including a saturable transformer for both isolating the circuits of a first and a second load means and producing, in the first and second load means, first and second signals varying inversely and nonlinearly.

Figure 1:
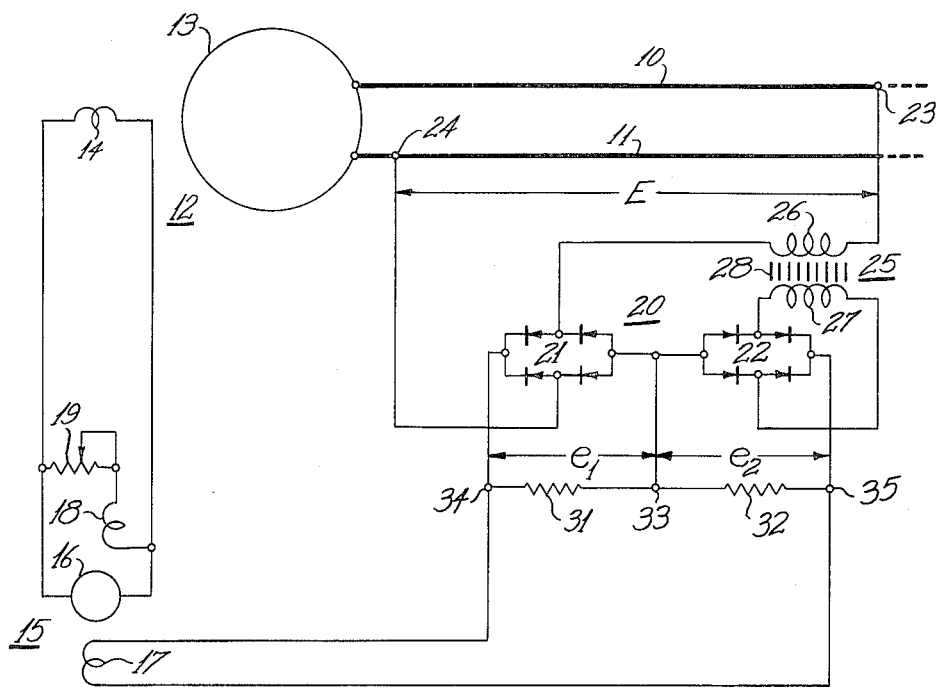
Figure 2:
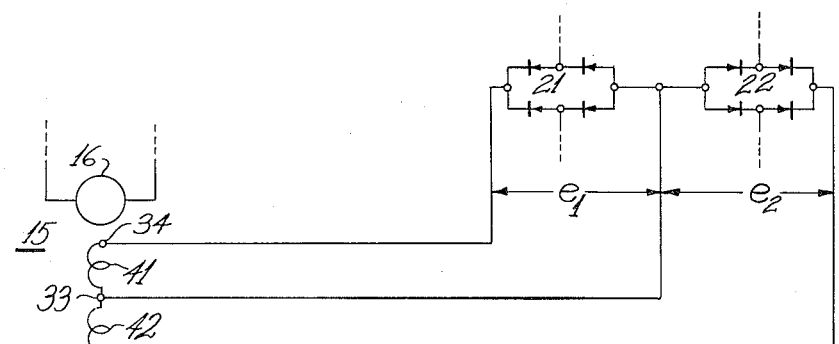
Figure 3:
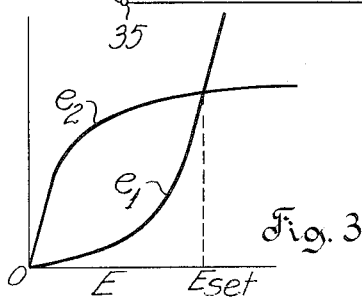

Objects and advantages other than those set forth above will be apparent from the following description when read in connection with the accompanying drawing, in which:

Fig. 1 diagrammatically illustrates one embodiment of the invention;

Fig. 2 diagrammatically illustrates an alternate embodiment of the invention; and Fig. 3 is a graph presenting a group of curves illustrating the operation of the invention.

As shown in Fig. 1, one embodiment of the invention is illustrated in connection with the control of the voltage of an A. C. electric network represented by conductors 10, 11. Conductors 10, 11 are supplied from the armature 13 of an A. C. generator 12 having a field winding 14. Field winding 14 is energized from a suitable controllable source of direct current such as the armature 16 of an exciter generator 15. Exciter generator 15 is provided with a control field winding 17 and a self-energized field winding 18 connected in circuit with armature 16; for instance, field winding 18 may be connected across armature 16 in series with an adjustable resistor 19 to form a first circuit. Field windings 17, 18 comprise field winding means for controlling the voltage of associated armature 16. It will be understood that the number of exciter generators utilized is dependent upon the desired power amplification of the signal input.

Voltage deviation detector 20 energizes field winding 17 to cause the field winding to supply the exciter with a reversible magnetomotive force varying both in direction and magnitude with deviations of the regulated voltage from the predetermined desired value. The deviation detector is connected to terminals 23, 24 to respond to the regulated voltage.

The voltage deviation detector comprises a saturable transformer 25, full wave rectifiers 21, 22, and a pair of load elements such as resistive load elements 31, 32.

The primary winding 26 of the saturable transformer is connected in series with the A. C. terminals of rectifier 21 across terminals 23, 24 to be energized by the regulated voltage. Resistive load element 31 is connected across the D. C. terminals of rectifier 21. The secondary winding 27 of the saturable transformer is isolated from the primary winding 26 and is connected in series circuit with the A. C. terminals of full wave rectifier 22. Resistive load element 32 is connected across the D. C. terminals of rectifier 22.

Resistive load element 31 is thus effectively connected in series with the primary winding 26 to be traversed by the current traversing the primary winding. Voltage $e_1$, across load element 31, varies as does the voltage across the A. C. terminals of rectifier 21. Neglecting losses in rectifier 21, the voltage $e_1$, across load element 31, is equal to the voltage across the input or A. C. terminals of rectifier 21.

Resistive load element 32 is effectively connected across secondary winding 27 to be in series therewith and is traversed by the current induced in and traversing the secondary winding. Voltage $e_2$, across load element 32, varies as does the voltage across the primary of the transformer. Neglecting losses, and assuming a 1:1 ratio of transformation, the voltage $e_2$, across load element 32, is equal to the voltage across the primary winding of the transformer.

Referring to Fig. 3, it is seen that the voltages $e_1$, $e_2$ vary inversely of each other in a nonlinear manner as voltage E, the regulated voltage, is varied. The intersection of the lines represents the condition when the regulated voltage E is at the predetermined desired value, $E_{set}$, and the voltages $e_1$, $e_2$ are equal. At values of E less than $E_{set}$, the core 28 of the saturable transformer is far from being saturated, and the primary winding 26 has thereacross a greater share of the voltage E than exists across the A. C. terminals of the rectifier 21. At values of E greater than $E_{set}$, the core 28 is nearly saturated, and the A. C. terminals of the rectifier 21 have thereacross a greater share of the voltage E than exists across the primary winding.

It is thus seen that the difference between voltages $e_1$ and $e_2$ varies in both magnitude and direction with deviations of the regulated voltage from the predetermined desired value.

The resistive load devices 31, 32 are connected together at common terminal 33. Field winding 17 is connected across terminals 34, 35, and thus field winding 17 receives a reversible voltage which is the difference of voltages $e_1$, $e_2$. The exciter 15 is therefore supplied with a reversible magnetomotive force signal varying in both direction and magnitude with deviations of the regulated voltage from the predetermined value.

When the regulated voltage is at the desired value, the voltage input to field winding 17 is zero. With resistor 19 properly adjusted so that the exciter 15 is fully self-excited, armature 16 supplies to field winding 14 current just sufficient to maintain the regulated voltage of conductors 10, 11 at the desired voltage.

If the regulated voltage should fall below the desired value, field winding 17 acts to aid field winding 18 and if the regulated voltage should rise above the desired value, field winding 17 acts to oppose field winding 18. Field winding 17 thus supplies exciter 15 with a reversible magnetomotive force signal for causing exciter 15 to excite generator 12 so as to maintain the regulated voltage at the predetermined desired value.

Fig. 2 illustrates an alternate embodiment in which the load devices are field windings 41, 42 of exciter 15. Field windings 41, 42 are connected together and are connected to rectifiers 21, 22 in the same manner as are resistive load devices 31, 32 in Fig. 1. Field winding 41 therefore produces a magnetomotive force proportional to voltage $e_1$ and field winding 42 produces a magnetomotive force proportional to voltage $e_2$. These magnetomotive forces are in opposition and the exciter therefore receives a magnetomotive force signal which varies both in magnitude and direction with deviations of the regulated voltage E from the predetermined desired value $E_{set}$. This magnetomotive force signal causes exciter 15 to excite the generator so as to maintain the regulated voltage at the desired value.

The saturable transformer 25, in combination with the rectifiers 21, 22, and the load elements, provides independent or isolated circuits for the load elements as well as producing, in the load elements, signals which vary inversely with each other in a nonlinear manner. The voltage deviation detector of this invention therefore eliminates the need for extra equipment such as an isolating transformer, an isolating wiring arrangement, or a center tapped load element arrangement for providing independent or isolating circuits for the load elements. The invention also eliminates the need for a pair of separate detector elements such as a pair of reactors or a pair of resistors having dissimilar current resistance-characteristics.

Although but two embodiments have been illustrated and described, it will be apparent to those skilled in the art that various changes and modifications may be made therein without departing from the spirit of the invention or from the scope of the appended claims.

It is claimed and desired to secure by Letters Patent:

1. A voltage deviation detector for a source of variable voltage comprising: a saturable transformer having a primary winding and a secondary winding isolated from each other and having said primary winding energized by said source, a first element connected to be traversed by the current traversing said primary winding for producing a signal in said first element, a second element connected to be traversed by the current induced in said secondary winding by the current traversing said primary winding for producing a signal in said second element, and means responsive to the difference of said signals for producing a control signal varying in magnitude and direction with deviations of said variable voltage from a predetermined value.

2. A voltage deviation detector for a source of variable voltage comprising: a saturable transformer having a primary winding and a secondary winding isolated from each other, a first element, means connecting said first element and said primary winding in series circuit across said source for producing a signal in said first element, a second element, means connecting said second element in series with said secondary winding for producing a signal in said second element, and means responsive to the difference of said signals for producing a control signal varying in magnitude and direction with deviations of said variable voltage from a predetermined value.

3. A voltage deviation detector for an alternating current source of variable voltage comprising: a saturable transformer having a primary winding and a secondary winding isolated from each other, a first element, a rectifier connecting said first element and said primary winding in series circuit across said source for producing a unidirectional signal in said first element, a second element, a rectifier connecting said second element in series with said secondary winding for producing a unidirectional signal in said second element, and means differentially responsive to said signals for producing a control signal varying in magnitude and direction with deviations of said variable voltage from a predetermined value.

4. A voltage deviation detector for an alternating current source of variable voltage comprising: a saturable transformer having a primary winding and a secondary winding isolated from each other, a first full wave rectifier, means connecting said primary winding and the alternating current terminals of said first rectifier in series circuit across said source, a first signal winding, means connecting said first signal winding across the direct current terminals of said first rectifier for producing a unidirectional signal in said first signal winding, a second full wave rectifier, means connecting said secondary winding across the alternating current terminals of said second rectifier, a second signal winding, means connecting said second signal winding across the direct current terminals of said second rectifier for producing a unidirectional signal in said second signal winding, and means responsive to the difference of said signals for producing a control signal varying in magnitude and direction with deviations of said variable voltage from a predetermined value.

5. A voltage deviation detector for an alternating current source of variable voltage comprising: a saturable transformer having a primary winding and a secondary winding isolated from each other, a first full wave rectifier, means connecting said primary winding and the alternating current terminals of said first rectifier in series circuit across said source, a first resistor, means connecting said first resistor across the direct current terminals of said first rectifier for producing a unidirectional signal in said first resistor, a second full wave rectifier, means connecting said secondary winding across the alternating current terminals of said second rectifier, a second resistor, means connecting said second resistor across the direct current terminals of said second rectifier for producing unidirectional signal in said second resistor, and means differentially responsive to said unidirectional signals for producing a control signal varying in magnitude and direction with deviations of said variable voltage from a predetermined value.

6. A voltage regulating system for an alternating current generator comprising: a saturable transformer having a primary winding and a secondary winding isolated from each other, a first element, means connecting said first element and said primary winding in series circuit across the terminals of said generator for producing a signal in said first element, a second element, means connecting said second element in series with said secondary winding for producing a signal in said second element, means responsive to the difference of said signals for producing a control signal varying in magnitude and direction with deviations of said variable voltage from a predetermined value, and means responsive to said control signal for controlling the voltage of said generator to maintain said voltage at said predetermined value.

7. A voltage deviation detector for a source of variable voltage comprising: first and second load means effectively connected in series across said source, means for varying the voltage of said first and second load means for causing the voltage applied to said two load means to have inversely curved voltage characteristics and for causing the voltage of said two load means to be equal at a predetermined voltage of said source, and means responsive to the differential of voltage of said two load means for producing a control signal varying in magnitude and direction with deviations of said voltage from said predetermined voltage.

8. A voltage deviation detector for a source of variable voltage comprising: a saturable transformer having a primary winding and a secondary winding isolated from each other, a first element, means connecting said first element and said primary winding in series circuit across said source for producing a signal in said first element, a second element, means connecting said second element across said secondary winding for producing a signal in said second element, and means responsive to the difference of said signals for producing a control signal varying in magnitude and direction with deviations of said variable voltage from a predetermined value.

9. A voltage deviation detector for an alternating current source of variable voltage comprising: a saturable transformer having a primary winding and a secondary winding isolated from each other, a first element, a rectifier connecting said first element and said primary winding in series circuit across said source for producing a unidirectional signal in said first element, a second element, a rectifier connecting said second element across said secondary winding for producing a unidirectional signal in said second element, and means differentially responsive to said signals for producing a control signal varying in magnitude and direction with deviations of said variable voltage from a predetermined value.

No references cited.